US 8,406,810 B1

(12) United States Patent
Kamal et al.

(10) Patent No.: US 8,406,810 B1
(45) Date of Patent: Mar. 26, 2013

(54) MAGNETIC SEMICONDUCTOR ELEMENT FOR AUTHENTICATION AND USER DEVICE USING SUCH AN ELEMENT

(75) Inventors: Mohammad Ashfaq Kamal, King of Prussia, PA (US); Praveen Venkataramu, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 11 days.

(21) Appl. No.: 13/243,209

(22) Filed: Sep. 23, 2011

(51) Int. Cl.
*H04M 1/00* (2006.01)
(52) U.S. Cl. ..... 455/558; 455/411; 455/406; 455/550.1; 455/90.3
(58) Field of Classification Search .................. 455/558, 455/550.1, 405–411; 379/114.14, 114.17, 379/114.19
See application file for complete search history.

(56) References Cited

U.S. PATENT DOCUMENTS

| | | | | |
|---|---|---|---|---|
| 5,220,593 | A * | 6/1993 | Zicker et al. | 455/407 |
| 5,388,148 | A * | 2/1995 | Seiderman | 455/404.1 |
| 6,088,585 | A * | 7/2000 | Schmitt et al. | 455/411 |
| 6,859,650 | B1 * | 2/2005 | Ritter | 455/406 |
| 7,228,155 | B2 * | 6/2007 | Saunders | 455/558 |
| 7,738,839 | B2 * | 6/2010 | Kurokawa | 455/73 |
| 8,061,609 | B2 * | 11/2011 | Fagrenius et al. | 235/441 |
| 8,160,636 | B2 * | 4/2012 | Tadokoro | 455/550.1 |
| 2004/0203594 | A1 * | 10/2004 | Kotzin et al. | 455/411 |
| 2004/0235450 | A1 * | 11/2004 | Rosenberg | 455/406 |

OTHER PUBLICATIONS

ETSI TS 102 221 V7.13.0 (Jan. 2009), Technical Specification, Smart Cards; UICC-Terminal interface; Physical and logical characteristics (Release 7).
R. Anderson, Ferromagnetic Semiconductors, Apr. 28, 2009.

* cited by examiner

*Primary Examiner* — Sharad Rampuria (57) ABSTRACT

An authentication semiconductor element (such as a chip for a user identity card) and an associated user device include magnetic elements for automatically aligning and holding in place the authentication element on electrical contacts of the user device. The authentication semiconductor element includes a substrate, an electrical circuit, electrical contacts formed on the surface of the substrate, and at least two magnetic elements located on the substrate. The user device includes a communication interface, a processor, and a socket for receiving an authentication semiconductor element. The socket includes electrical contacts and at least two magnetic elements positioned to magnetically interact with the magnetic elements of the authentication element and automatically align the electrical contacts of the authentication element on corresponding electrical contacts of the socket.

19 Claims, 5 Drawing Sheets

MAGNETIC SEMICONDUCTOR ELEMENT FOR AUTHENTICATION AND USER DEVICE USING SUCH AN ELEMENT

TECHNICAL FIELD

The present subject matter relates to technology to automatically align and hold in place on electrical contacts of a user device a semiconductor element used for device authentication (such as a chip for a user identity card) having a small form factor and to equipment such as the element and/or the device that embody the alignment technology.

BACKGROUND

Mobile phones and other user devices rely on a user identity card to identify the phone or device for communication on a communication network. The user identity card (UIC) can be a Subscriber Identification Module (SIM) card used in a GSM network, a Universal Integrated Circuit Card (UICC) used in a UMTS network, a Removable User Identity Module (R-UIM) used in a CDMA network, or the like. The UIC is an integrated circuit that securely stores a unique identifier for identifying a subscriber on a mobile network. When the UIC is installed in a mobile phone or other device requiring access to the mobile network, the UIC is communicatively coupled to a processor of the mobile device. The processor retrieves the unique identifier from the UIC in order to uniquely identify the device on the network.

For example, a SIM card stores a unique International Mobile Subscriber Identity (IMSI) identifier. The IMSI is sent to the network by a device in which the SIM card is installed to identify the device, and to enable the network to retrieve subscriber information associated with the IMSI from a home location register (HLR) or visitor location register (VLR) of the network. The UIC is most often removably inserted into a device. However, some UICs are permanently soldered into the device.

UICs such as SIM cards come in three standardized form factors, each of the form factors including a semiconductor substrate having electronic components and electrical contacts formed on a surface of the substrate. The standard SIM card includes a plastic or other rigid medium onto which the semiconductor substrate is mounted. The micro-SIM card is similar to the standard SIM card but has a smaller sized rigid plastic medium onto which with the semiconductor substrate is mounted. In both cases, the rigid plastic medium is large enough to allow a user to easily manipulate the SIM card and to enable the user to slide the SIM card into a slot in a user device. The rigid plastic medium is shaped such that it properly aligns the SIM card within the slot in the device. The rigid plastic medium provides a resilient platform onto which the semiconductor substrate is mounted, and helps protect the substrate, electronic components, and electrical contacts from impacts and damage. Both the standard and micro SIM cards are designed to be readily insertable into and removable from user devices, to enable a user to use the same SIM card in different user devices. The size of the rigid plastic medium, however, imposes a limit on the miniaturization of the standard and micro SIM cards, of the slots they are inserted into, and of the devices they are installed in.

The third standardized SIM card form factor is the soldered SIM card, which includes a semiconductor substrate and electronics as in the standard and micro SIM cards, but does not include the rigid plastic medium. The soldered SIM card is smaller in size than both the standard and micro SIM cards. However, because the soldered SIM card is permanently soldered into a user device, it is not removable from the user device or transferable to a different user device.

UICs (such as SIM cards or the like) currently in use either include bulky plastic mediums and connectors, placing a limit on user device size reduction, or are soldered into user devices, preventing users from exchanging UICs between user devices. As a result, a compact UIC form factor and UIC connector are needed to reduce the size of UICs and UIC connectors while maintaining UICs' removability.

SUMMARY

The teachings herein alleviate one or more of the above noted problems with a compact and removable authentication semiconductor element, for example, by magnetic elements to automatically align and hold in place the authentication element on electrical contacts of a user device. An additional rigid plastic medium may no longer be necessary. However, soldering or other permanent connection is not necessary so that the authentication element may be used in another compatible device or replaced in one device with a similar element bearing a credential for a different user identity.

An authentication semiconductor element for a portable user device includes a semiconductor substrate, an electrical circuit, electrical contacts, and at least two magnetic elements. The electrical circuit includes interconnected components embodied in the semiconductor substrate and configured to provide a function related to authentication of the portable user device to an external system or network. The electrical contacts are formed on a surface of the semiconductor substrate, are connected to the electrical circuit, and at least some of the contacts are positioned on the surface for contacting complimentary contacts of the portable user device when the authentication semiconductor element is installed in the portable user device. The magnetic elements are located on the semiconductor substrate at positions for magnetic interaction with one or more parts of the portable user device to magnetically align the semiconductor substrate when installed in the portable user device so that the electrical contacts of the authentication semiconductor element are aligned with the complimentary contacts of the portable user device. In various examples, the magnetic elements are magnets, are formed of a magnetic material such as a ferromagnetic material, and/or are regions of the semiconductor substrate doped with magnetic atoms.

A portable user device includes a communication interface for communication with an external system or network, a processor coupled to the communication interface, and a socket for receiving and providing a connection of the processor to an authentication semiconductor element. The socket includes electrical contacts and at least two magnetic elements. The electrical contacts are formed a surface in the portable device and are electrically connected to the processor, and a plurality of the electrical contacts are positioned on the surface for contacting complimentary contacts of the authentication semiconductor element when the authentication semiconductor element is installed in the portable user device. The magnetic elements are located on the portable user device at positions for magnetic interaction with one or more parts of the authentication semiconductor element to magnetically align the authentication semiconductor element when installed in the portable user device so that the complimentary contacts of the authentication semiconductor element are aligned with the electrical contacts of the portable user device.

In one example, the communication interface of the portable user device includes a wireless transceiver for communication via a mobile communication network, and the processor is configured so that the portable user device functions as a mobile station configured to use the authentication semiconductor element when installed to provide a user identity card function for authentication of the mobile station.

In another example, the communication interface includes a wireless transceiver for communication with a wireless payment terminal, and the processor is configured so that the portable user device functions as a wireless payment device configured to use the authentication semiconductor element when installed to provide a secure element function for authentication of a wireless payment transaction.

In another example, an apparatus includes a portable user device and an authentication semiconductor element. The portable user device has a communication interface for communication with an external system or network, a processor coupled to the communication interface, a socket including electrical contacts electrically connected to the processor, and magnetic elements configured to align in place an authentication semiconductor element installed in the portable user device. The authentication semiconductor element has a semiconductor substrate, an electrical circuit, electrical contacts, and magnetic elements. The electrical circuit includes interconnected components embodied in the semiconductor substrate and is configured to provide authentication of the portable user device to the external system or network. The electrical contacts of the semiconductor element are formed on a surface of the semiconductor substrate connected to the electrical circuit, and are positioned on the surface for contacting complimentary electrical contacts of the socket when the authentication semiconductor element is installed in the portable user device. The magnetic elements of the semiconductor element are located on the semiconductor substrate at positions for interaction with the magnetic elements of the portable user device. The magnetic elements of one of the portable user device and the authentication semiconductor element are magnets that are configured to magnetically interact with the magnetic elements of the other of the portable user device and the authentication semiconductor elements to align the semiconductor substrate when installed in the portable user device so that the electrical contacts of the authentication semiconductor element are aligned with the complimentary electrical contacts of the socket.

As a result, a compact authentication semiconductor element is provided that can be removably inserted into the socket of a user device, and does not require mounting on a sizeable rigid plastic medium or require permanent soldering into place.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various user devices and authentication semiconductor elements disclosed herein relate to technology for automatically aligning and holding in place on electrical contacts of a user device an authentication semiconductor element (such as a user identity card (UIC)) having a small form factor and to equipment such as the element and/or the device that embody the alignment technology.

An authentication semiconductor element (such as a UIC or a secure element) is a semiconductor device that includes a dedicated memory, runs its own operating system, and is used to authenticate over a wireless or other network connection the identity of a user device it is electrically connected to. For example, a UIC such as a SIM card authenticates a user mobile device on a mobile network; a secure element authenticates a user device in a wireless payment transaction. The authentication semiconductor element has a small form factor.

Figure 1A:
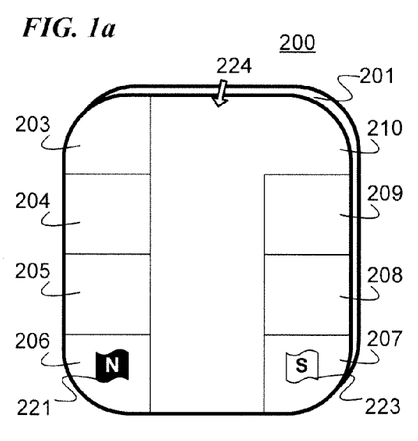
FIGS. 1a and 1b are front and rear oblique views, respectively, of an authentication semiconductor element (such as a user identity card) including magnetic elements.
Figure 1B:
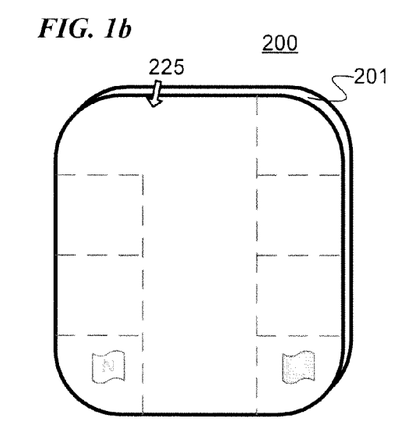

In a first example described with reference to FIGS. 1a and 1b, a semiconductor substrate has an authentication semiconductor element formed on its surface. One or more electrical contacts on the surface of the authentication semiconductor element are formed of a magnetic material. The electrical contacts formed of magnetic material confer magnetic properties to the authentication semiconductor element, such that when the substrate is placed within a user device having selectively placed magnetic elements, the substrate automatically aligns with the magnetic elements to place the electrical contacts on the surface of the authentication semiconductor element in alignment with corresponding electrical contacts formed in the user device. As such, the substrate has a small form factor, is removable from the user device, and automatically aligns into place in the user device.

In a second implementation described with reference to FIG. 1d, a magnetic semiconductor substrate has an authentication semiconductor element formed on its surface. The substrate is formed of a semiconductor (e.g., GaAs), and has magnetic ions or atoms (i.e., atoms formed of magnetic materials such as Manganese, Chromium, Cobalt, Iron, and Nickel) inserted into the semiconductor lattice in an interstitial position, rather than substituting for one of the atoms forming the lattice. The magnetic atoms inserted in the semiconductor lattice confer magnetic properties to the semiconductor substrate, such that when the substrate is placed within a user device having selectively placed magnetic elements, the substrate automatically aligns with the magnetic elements to place electrical contacts formed on the surface of the authentication semiconductor element in alignment with corresponding electrical contacts formed in the user device. As such, the substrate has a small form factor, is removable from the user device, and automatically aligns into place in the user device.

Reference now is made in detail to the examples illustrated in the accompanying drawings and discussed below. FIGS. 1a and 1b illustrate front and rear oblique views, respectively, of an authentication semiconductor element 200 (such as a user identity card). The "front" and "rear" terms as used throughout the specification are not intended to limit the scope of the description and figures. The "front" term is used to more succinctly refer to a first surface, side, or view of an object, while the "back" term is used to more succinctly refer to a second opposing surface, side, or view of the object.

Authentication semiconductor element 200 includes a substrate 201 having a plurality of electrical contacts 203-210 formed on a front surface 224 thereof, and a back surface 225. Substrate 201 is formed of a semiconductor, such as silicon (Si), germanium (Ge), silicon germanium (SiGe), gallium arsenide (GaAs), or the like. Substrate 201 has an electrical circuit formed of interconnected functional components (illustratively shown in block diagram form in FIG. 6) embodied in its volume or formed on one or more of its surface(s). The electrical circuit, which is coupled to the electrical contacts 203-210, is not shown in FIGS. 1a and 1b for convenience. The electrical circuit is configured to provide a function related to authentication of a portable user device to an external system or network when the semiconductor element 200 is installed in the portable user device.

Each of the electrical contacts 203-210 can serve as an input/output pin for the electrical circuit and/or components formed in substrate 201. In one example, the function assigned to each contact 203-210 corresponds to the function assigned to the contact according to the standards for interfaces of universal integrated circuit card (UICC) set by the European Telecommunications Standards Institute (ETSI). According to the UICC standard, contact 203 is used to provide an upper power supply voltage Vcc to the electrical circuit; contact 204 is used to input a reset signal to the electrical circuit; contact 205 is used to input a clock signal; contact 208 is used for data input/output with the electrical circuit; contact 209 is used to provide an oscillating peak-to-peak voltage Vpp to the electrical circuit; and contact 210 is a ground node GND that has a larger surface area than any of the other contacts 203-209. Contacts 206 and 207 are reserved for future use, and are thus not functionally connected to the electrical circuit. In one example, electrical contacts 203-210 are formed of one or more conductive layers such as metal layers deposited on the surface of substrate 201.

Authentication semiconductor element 200 further includes one or more magnetic elements. As shown in FIG. 1a, two magnetic elements 221 and 223 can be formed in element 200. The magnetic elements 221 and 223 are configured to magnetically interact with one or more parts of a user device in which the semiconductor element 200 is installed to align and hold element 200 in place in the user device. Each magnetic element 221, 223 can be formed of a magnet or of a magnetic or ferromagnetic material that can be attracted by a magnet. In the example shown in FIG. 1a, magnetic elements 221 and 223 are formed of magnets having opposite polarities, i.e. magnets having magnetic moments pointing in substantially opposite directions such that, for example, magnet 221 has a North (N) pole at or near the front surface 224 and magnet 223 has a South (S) pole at or near the front surface 224. Because of the orientation of magnets 221 and 223 in FIGS. 1a and 1b, complementary S and N magnetic poles may respectively be formed at or near a rear surface 225 of element 200 at locations corresponding to magnets 221 and 223. In other examples, however, magnetic elements 221 and 223 can be formed of magnets of the same polarities, magnets having multiple polarities (e.g., a cylindrical magnet having a central portion or core of one polarity and an outer portion or diameter of another polarity), or formed of ferromagnetic materials. In other examples, different numbers of magnetic elements can be included in authentication semiconductor element 200, and/or magnetic elements can be located in different locations on the front or rear surfaces or in the volume of semiconductor element 200. FIG. 1b illustratively shows lines corresponding to delineations between contacts 203-210 and two magnetic elements corresponding to elements 221 and 223 in outline to stylistically indicate the relative positions of the contacts 203-210 and magnetic elements 221 and 223 by transparency on the rear surface 225 of element 200; however, in the particular example shown in the figure, no contacts or magnetic elements are formed on the rear surface 225 of element 200. In other examples, however, contacts or magnetic elements could be formed on the rear surface 225 or on side surfaces of element 200. In one example, one or more magnets are formed on the rear surface 225 of authentication element 200.

Figure 1C:
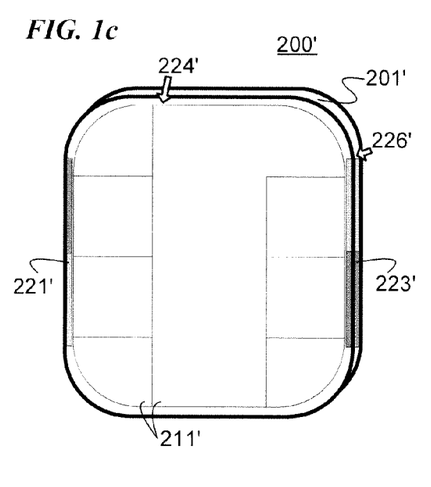
FIG. 1c is a front oblique view of an alternative authentication semiconductor element having magnetic elements formed on side surfaces.
Figure 1D:
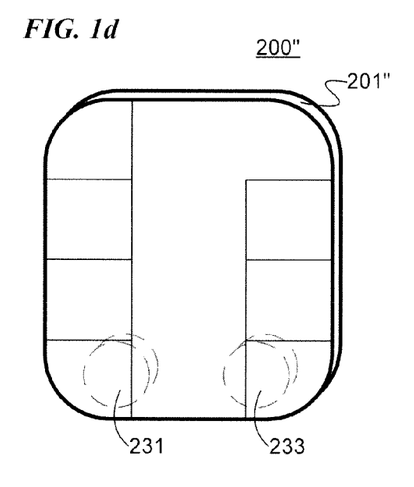
FIG. 1d is a front view of an authentication semiconductor element including magnetic elements formed within its volume.

FIG. 1c illustrates a front oblique view of an alternative authentication element 200' having magnetic elements 221' and 223' formed substantially on or near side surfaces 226' of substrate 201'. As shown in FIG. 1c, portions of magnetic elements 221' and 223' may also stretch onto or near the front surface 224' of substrate 201'. Magnetic elements 221' and 223' may be formed on or near side surfaces of authentication element 200' in order to locate the magnetic elements away from an electrical circuit formed in or near a central portion of substrate 201', for example. In addition, magnetic elements 221' and 223' may be spaced away from electrical contacts (shown generally at 211') formed on the front surface 224' of substrate 201', to minimize electrical interferences between the electrical contacts 211' and the magnetic elements 221', 223' when electrical power or signals are flowing through the contacts 211'. In the example of FIG. 1c, electrical contacts 211' are spaced away from edges of surface 224' to avoid contact between the magnetic elements and the electrical contacts. In other examples, magnetic elements may be formed on portions of substrate 201 not having electrical contacts, or on portions of substrate 201 having electrical contacts that are not used for communication (e.g., in locations of electrical contacts that are reserved for future use) to minimize electrical interference between the magnetic elements and the contacts. In examples in which magnetic elements are located at positions on substrate 201 generally having electrical contacts that are not used for communication, the electrical contacts not used for communication may be removed or otherwise replaced by the magnetic elements.

Each magnetic element 221' and 223' is further shown in FIG. 1c as being a dipole magnet having respective N and S poles located adjacent to each other on side surfaces 226' of substrate 201', and on those portions of front surface 224' that the magnetic elements reach. The respective N and S poles are illustratively shown in FIG. 1c as boxes having darker and lighter shades, respectively.

Magnetic elements such as magnetic elements 221 and 223 are formed in multiple ways. In examples in which magnetic elements are ferromagnetic, the magnetic elements may be formed by depositing a ferromagnetic metal or other ferromagnetic substance on a surface of substrate 201 (e.g., deposited by chemical or physical vapor deposition, sputtering, electroplating, or by another semiconductor manufacturing method). For example, a metal alloy including one or more of iron, nickel, cobalt, rare earth metals, or other ferromagnetic substances can be used. The metal alloy can also serve as an electrical contact on the surface of substrate 201, such that magnetic elements 221 and 223 serve as electrical contacts (such as contacts 203-210) on the surface of substrate 201. Alternatively, a non-metallic substance impregnated with one or more ferromagnetic substances can be used as magnetic elements, such as a ceramic substance forming a ceramic magnet.

In examples in which magnetic elements are magnets, the magnetic elements can be formed by depositing a magnetic substance on the surface of or within the volume of substrate 201, and/or by including atoms of magnetic materials within the lattice structure of the semiconductor forming the substrate 201. Magnetic substances that can be deposited on the surface or within the volume of substrate 201 include ceramic, ferrite, alnico, or other materials used in the manufacture of magnets. Other magnetic substances can also be used. The magnetic substances can replace or form part of one or more electrical contacts 203-210, or can be placed over or under the surface of one or more contacts 203-210. In examples in which the magnetic substances form part of or are placed over contacts 203-210, the magnetic substances are preferably selected to be good electrical conductors that sufficiently conduct electrical currents and signals being input to or output from contacts 203-210. In such examples, the magnetic elements should further be designed to have magnetic properties that are not negatively affected by currents flowing through them or near them.

The magnetic material can also be inserted within the lattice structure of the semiconductor forming the substrate 201. For example, atoms of magnetic materials that can be substituted into or inserted into the semiconductor lattice by doping of the semiconductor lattice include manganese, chromium, cobalt, iron, nickel, and/or combinations thereof. In one example, manganese atoms are substituted or inserted into a GaAs semiconductor substrate. The magnetic material can be evenly inserted throughout the volume of substrate 201, or selectively inserted into particular regions of substrate 201. The magnetic materials inserted into the substrate can be polarized to form various magnetic polarity patterns within and outside of substrate 201. FIG. 1d illustratively shows an authentication semiconductor element 200" in which magnetic elements 231, 233 are formed within the volume of substrate 201". Magnetic elements 231, 233 can be formed, for example, by doping regions of substrate 201" with magnetic atoms, as described above. Magnetic elements 231, 233 are equivalent to magnetic elements 221, 223 shown in FIG. 1a, and references to magnetic elements 221, 223 throughout this description should be understood to also refer to magnetic elements 231, 233 in embodiments in which magnetic elements 221, 223 are or could be formed within the volume of substrate 201".

Figure 2A:
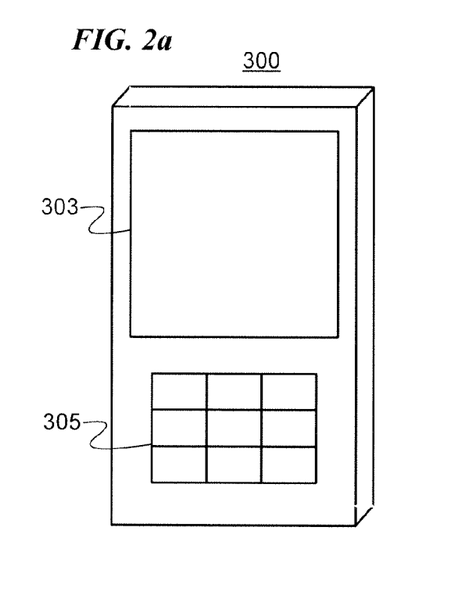
FIGS. 2a and 2b are front and rear oblique views, respectively, of a user device having a socket, including magnetic elements, for accepting an authentication semiconductor element.
Figure 2B:
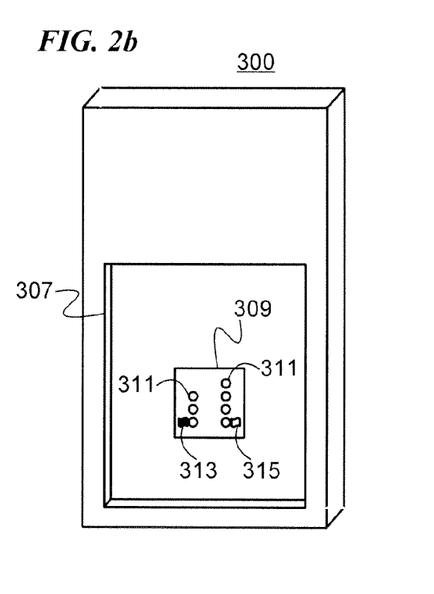

Authentication semiconductor element 200 is configured for use in conjunction with a user device. FIGS. 2a and 2b illustrate front and rear oblique views, respectively, of a user device 300 having a socket 309 for connecting to authentication semiconductor elements such as authentication semiconductor element 200.

FIGS. 2a and 2b show user device 300 such as a mobile station having user interface elements, such as a display 303 and a keypad 305 located on a front surface thereof. A rear surface includes a compartment 307 such as a battery compartment illustratively shown open and not containing a battery. Compartment 307 includes a socket 309 for connecting to an authentication element 200. Socket 309, shown in more detail in FIG. 2c, includes a number of electrical contacts 311 positioned to contact complimentary electrical contacts among contacts 203-210 of authentication element 200 when authentication element 200 is properly aligned and installed in user device 300.

Figure 2C:
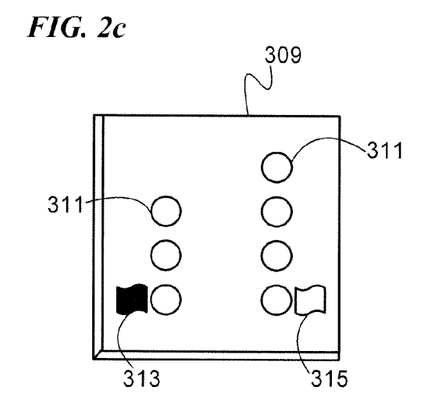
FIG. 2c is a detailed view of the socket of the device shown in FIGS. 2a and 2b.

Although referred to as a "socket" for convenience, the socket 309 may have little or no recess with respect to the inner surface of the battery compartment. Of note, the outline, edges, or shape of the socket structure need not interact with the edges or surfaces of the authentication element 200 to align the element 200 in the socket 309. Magnetic interaction is used to facilitate proper alignment and to hold the element 200 in the socket 309.

Figure 2D:
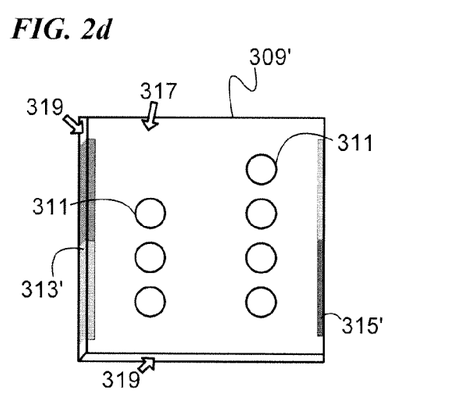
FIG. 2d is a detailed view of an alternate socket having magnetic elements located at side surfaces thereof.

However, in some examples, socket 309 can be recessed with respect to the inner surface of the battery compartment. FIG. 2d shows a detailed view of an alternate socket 309' that is recessed and has side surfaces 319 along the periphery of the socket. The socket 309' has a surface 317 having electrical contacts 311 located thereon. The socket 309' has magnetic elements 313', 315' located at or near the side surfaces 319 thereof. As shown in FIG. 2d, portions of magnetic elements 313', 315' may also extend onto or near surface 317 of socket 309. Magnetic elements 313' and 315' may be formed on side surfaces of the socket 309 in order to locate the magnetic elements away from electrical contacts 311, for example. Each magnetic element 313' and 315' may be formed of a dipole magnet having respective N and S poles located adjacent to each other on side surfaces 319 of socket 309', and on those portions of surface 317 that the magnetic elements extend onto. The respective N and S poles are illustratively shown in FIG. 2d as boxes having darker and lighter shades, respectively.

Hence, socket 309 includes magnetic elements 313 and 315. Each of the magnetic elements 313, 315 can be formed of a magnet, of a ferromagnetic material, and/or of an electromagnet. In particular, magnetic elements 313, 315 can be formed of ferromagnetic and magnetic materials and alloys such as those described above in relation to magnetic elements 221 and 223. Magnetic elements can alternatively be formed of electromagnets that produce magnetic fields when a current flows through them. Magnetic elements 313, 315 can be located on a surface of socket 309 (as shown in FIGS. 2b and 2c), or located underneath a surface of socket 309. Magnetic elements 313, 315 (also referred to herein as parts of user device 300) are located on socket 309 at positions such that each can magnetically interact with one or more of the parts of authentication element 200 such as magnetic elements 221, 223 to magnetically align authentication element 200 with socket 309 as the authentication element is installed in user device 300, such that complimentary contacts 203-210 of authentication element 200 are aligned with the electrical contacts 311 of user device 300. In one example, magnetic elements 313 and 221, 223 are positioned such that they come into substantial alignment, contact, or overlap with each other when authentication element 200 is properly aligned in socket 309.

In the examples illustratively shown in FIGS. 1a, 1b, and 2a-c, magnetic elements 313, 315 are two magnets of opposite magnetic polarities to each other, each magnetic element further being of the opposite polarity to the complimentary magnetic element 221, 223 of authentication element 200 that comes into contact with or into close proximity to the respective magnetic element when authentication element 200 is installed in device 300 and properly aligned in socket 309. In the illustrated examples, magnetic element 221 and 223 are magnets respectively magnetized with North (N) and South (S) polarities on or near front surface 224, while magnetic elements 313 and 315 are magnets respectively magnetized with North (N) and South (S) polarities on or near the surface of socket 309. In this way, there is a magnetic attraction between the N element 313 in the socket 309 and the S element 223 on the authentication element 200. Similarly, there is a magnetic attraction between the S element 315 in the socket 309 and the N element 221 on the authentication element 200. These attractive forces tend to draw the element 200 into desired alignment with the socket 309, in particular so as to align the contacts 203-210 with the respective complimentary contacts 311 of the socket 309. Of course, the opposite polarities could be used for the various magnets in our example.

In addition, magnetic repulsive forces may tend to prevent element 200 from being incorrectly oriented in the socket 309. For example, if element 200 is inserted upside down into the socket 309, magnetic repulsive forces will tend to push magnetic elements 313 and 221 away from each other, and to push magnetic elements 315 and 223 away from each other. In this way, the magnetic repulsive forces can assist in properly installing element 200 into socket 309, for example by hampering efforts to incorrectly install element 200 into the socket 309, and/or by flipping over element 200 such that it lies right side up on socket 309.

In general, at least two magnetic elements are included in socket 309, and at least two magnetic elements are included in authentication element 200. However, one, two or more magnetic elements can be included in socket 309 and/or authentication element 200. While the same number of magnetic elements is generally included in socket 309 and authentication element 200 to provide pairs of corresponding magnetic elements in the socket 309 and the element 200 that line up with each other when the element 200 is installed in the socket 309, different numbers of magnetic elements can also be included (e.g., four magnetic elements may be included in socket 309, while only two magnetic elements may be included in authentication element 200). For example, additional magnetic elements may be included in socket 309 to impede authentication element 200 from being improperly aligned or installed in the socket 309, and/or to facilitate authentication element 200 being properly installed and aligned in the socket 309. Magnetic elements of different sizes can also be included in socket 309 and authentication element 200. For example, smaller magnetic elements may be included in authentication element 200 because of space limitations, while larger magnetic elements may be included in socket 309 to provide magnetic force of sufficient strength to align element 200 within the socket 309.

Figure 3A:
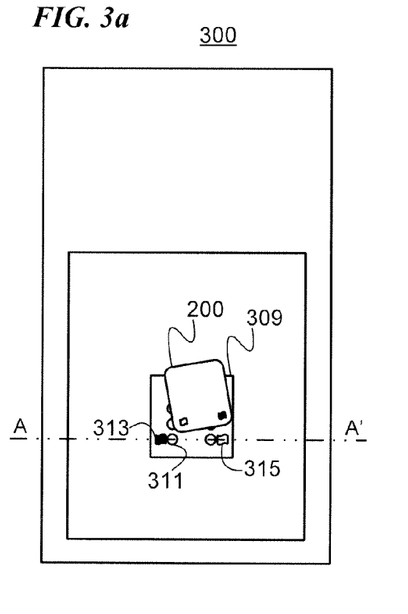
FIGS. 3a and 3b show sequential rear views of a user device having an authentication semiconductor element being installed in a socket of the user device.
Figure 3B:
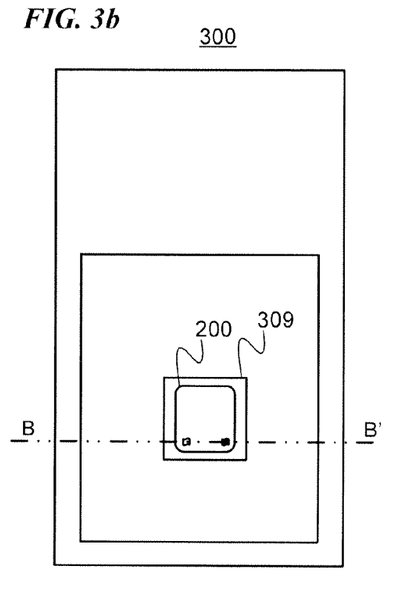

FIGS. 3a and 3b illustratively show rear views of a user device 300 having an authentication semiconductor element 200 placed on the socket 309 of the user device 300. FIG. 3a shows authentication element 200 just after it has been placed within user device 300, and before authentication element 200 has had a chance to automatically align with socket 309. FIG. 3b shows authentication element 200 after it has automatically aligned with socket 309 as a result of the magnetic attraction between magnetic elements 313, 315 of socket 309 and complimentary ones of magnetic elements 221, 223 of authentication element 200. As shown in FIGS. 3a and 3b, if authentication semiconductor element 200 is placed in the general vicinity of socket 309, the magnetic attraction and/or repulsion between magnetic elements 221, 223, 313, 315 of the element 200 and of the socket 309 cause the authentication element 200 to automatically align with the socket 309. As a result, electrical contacts on the surface of element 200 come into alignment and electrical contact with complimentary contacts of socket 309. In some examples, authentication element 200 may automatically align even if it is placed upside down (i.e., with rear surface 225 facing socket 309) on socket 309, provided magnetic elements 221, 223, 313, and 315 produce sufficiently strong magnetic fields.

Figure 4A:
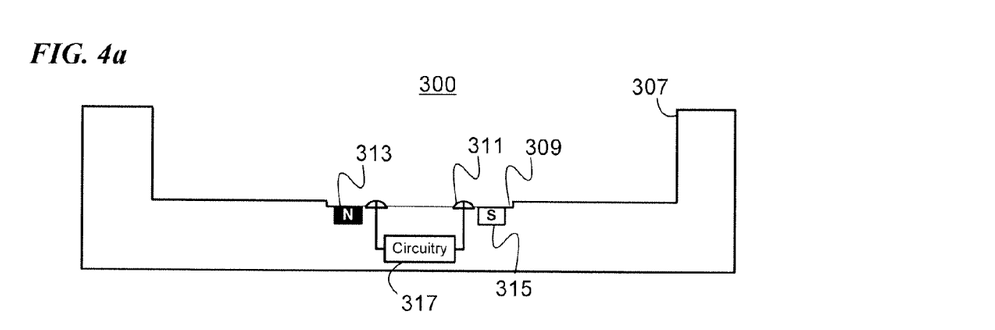
FIGS. 4a and 4b show cross-sectional views of the user device of FIGS. 3a and 3b shown along axes AA' and BB', and showing an authentication semiconductor element being installed in a socket of the user device.
Figure 4B:
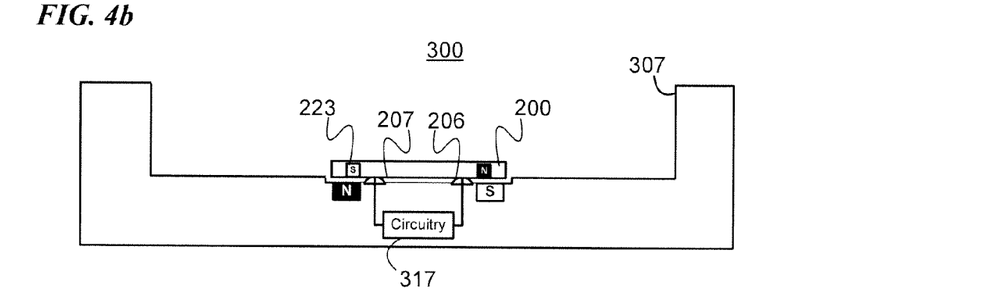

FIGS. 4a and 4b illustratively show cross-sectional views of user device 300 shown respectively along axes AA' and BB' of FIGS. 3a and 3b. FIG. 4a shows user device 300, compartment 307, socket 309, contacts 311, and magnetic elements 313, 315 prior to an authentication element aligning with socket 309 and coming into contact with contacts 311. FIG. 4b shows user device 300 after authentication element 200 has had a chance to automatically align with socket 309 and contacts 311 as a result of the magnetic attraction between magnetic elements 313 (N) and 315 (S) of socket 309 and complimentary ones of magnetic elements 221 (N) and 223 (S) of authentication element 200. In FIG. 4b, electrical contacts 206, 207 of authentication element 200 are shown as having come into alignment and electrical contact with corresponding ones of contacts 311 of socket 309. FIGS. 4a and 4b additionally show circuitry 317 electrically coupled to the electrical contacts 311. The circuitry 317 represents the processing, communication, and other circuitry contained in user device 300 and configured to interface with authentication element 200. Such circuitry is described in more detail in relation to FIG. 7 below.

The magnetic elements 221, 223, 313, 315 of the authentication element 200 and of the socket 309 are described herein as automatically aligning the authentication element 200 within socket 309 such that electrical contacts of the authentication element 200 come into contact with corresponding contacts of the socket 309. The magnetic elements 221, 223, 313, 315 can also be designed to hold authentication element 200 in place in socket 309, such that the corresponding contacts of the element 200 and socket 309 are electrically coupled to each other. In such examples, the magnetic elements 221, 223, 313, 315 should produce magnetic fields of sufficient strength to securely hold the element 200 in socket 309. The magnetic fields may need to counteract gravitational and other forces acting on element 200 and user device 300 to dislocate element 200 from socket 309 during normal use (e.g., acceleration forces due to the user device 300 being dropped onto a hard surface). In other examples, the magnetic elements 221, 223, 313, 315 are primarily used to align element 200 in socket 309 and other structures are used to securely hold the element 200 in the socket 309 after the element is brought into alignment within the socket. Such other structures can include a cover, door, and/or battery placed over element 200 (e.g., a battery placed over element 200 in compartment 307). The other structures can also include a spring or other resilient material (such as a resilient piece of foam) used to apply a constant force tending to push element 200 on the electrical contacts 311 of socket 309. In one example, the other structures are not sufficient to securely hold the element 200 in place by themselves, but the combination of the magnetic elements with the other structures are capable of holding the element 200 securely in place. In another example, the other structures are not sufficient to align the element 200 in socket 309, but the combination of the magnetic elements with the other structures are capable of aligning the element 200 in proper alignment within socket 309.

In the examples shown in FIGS. 1-4, two magnetic elements were shown on each of authentication element 200 and socket 309, the magnetic elements being located in adjacent (i.e., non-opposite) corners of the device and socket. In other examples, however, various numbers, configurations, and locations of magnetic elements can be used.

In one example, various types of magnetic elements are included on the authentication element 200 and on the socket 309. For instance, magnetic element 223 of authentication element 200 is ferromagnetic while corresponding magnetic element 313 of socket 309 is a magnet that is magnetically attracted to magnetic element 223. Magnetic element 315 of socket 309 is ferromagnetic while corresponding magnetic element 221 of element 200 is a magnet that is magnetically attracted to magnetic element 315.

Other examples can include magnetic elements having multiple poles. In one instance, a single magnetic element formed of a magnet having both a (N) pole and a (S) pole may be formed in socket 309 such that the (N) and (S) poles are adjacent to each other on or near a surface of socket 309 (see, e.g., magnetic elements 313', 315' of FIG. 2d). The single magnetic element may attract an authentication element 200 having a complimentary magnetic element formed of a magnet having both a (S) and a (N) pole adjacent to each other on or near the front or side surface of element 200 (e.g., such as magnetic element 221' or 223' illustratively shown in FIG. 1c). The single magnetic element of element 200 and the complimentary magnetic element may align themselves such that their respective magnetic moments align with the other's magnetic field, thereby bringing element 200 in alignment with socket 309. Alternatively, the single magnetic element may attract an authentication element 200 having a complimentary magnetic element formed of a ferromagnetic material such as iron, such that the complimentary magnetic element aligns itself above the (N) and (S) poles of the magnetic element of the socket 309 to bring the authentication element 200 into alignment with the socket 309.

Figure 5A:
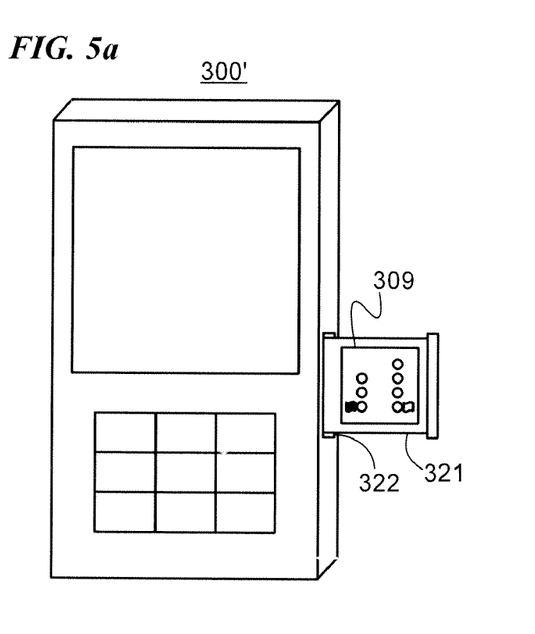
FIGS. 5a and 5b show user devices having sockets, including magnetic elements, formed therein for accepting authentication semiconductor elements.
Figure 5B:
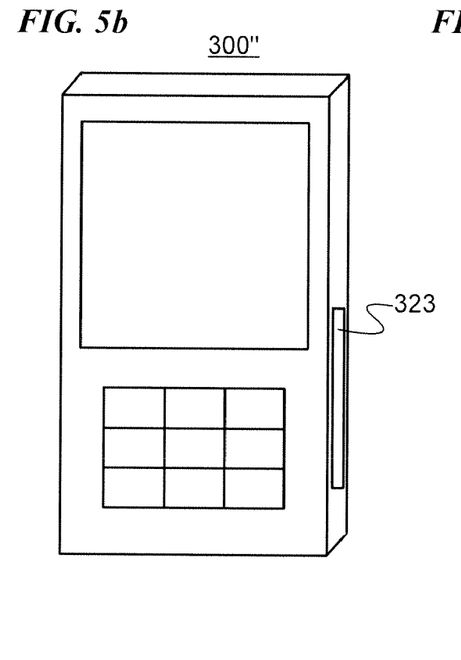
Figure 5C:
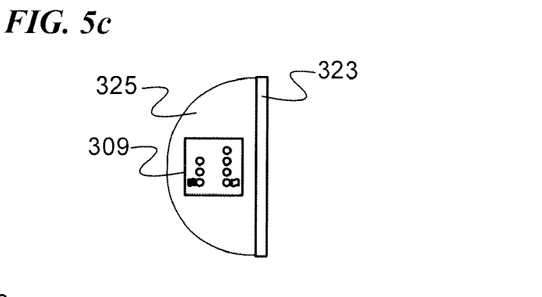
FIG. 5c is a detailed view of a cavity formed within a user device and having a socket for accepting an authentication element.

In the examples shown in FIGS. 2-4, the socket 309 is illustratively shown as being located in a compartment 307 formed in a rear surface of the user device 300. Socket 309, however, may be formed in various locations on the user device. For example, FIG. 5a shows a user device 300' having a tray 321 which slides into an opening 322 formed in a side of the user device, and which has a socket 309 formed on a surface of the tray for accepting an authentication element 200. Socket 309 is substantially similar to the socket described previously herein, and includes magnetic elements for bringing into alignment and/or holding in place an authentication element 200 installed in the socket. FIG. 5b shows another user device 300" having a slot 323 formed in a side of the user device for inserting an authentication element 200 into the slot. FIG. 5c illustratively shows a cavity 325 formed in user device 300", and having a socket 309 formed on a surface of the cavity for accepting an authentication element 200 inserted into the slot 323. The cavity 325 is generally sufficiently large to enable an authentication element 200 inserted into the slot 323 to rotate within the cavity in order to come into alignment with socket 309. In the example shown in FIG. 5c, the cavity 325 is semi-circular and has a radius substantially equal to the length of the diagonal of an authentication element 200 configured to be inserted into the slot. Other shapes or sizes of cavities 325 may also be used.

Figure 6:
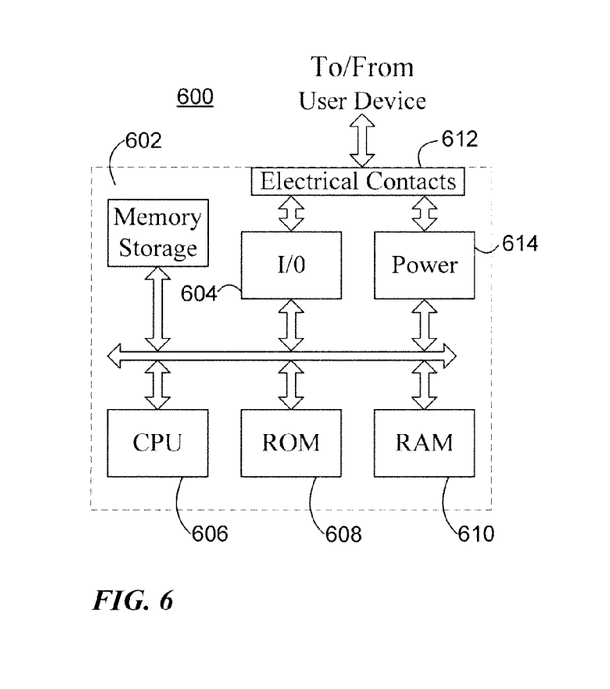
FIG. 6 is a simplified functional block diagram of an authentication semiconductor element that may be configured for use in a user device.

FIG. 6 shows a simplified functional block diagram of an authentication semiconductor element 600 that may be configured for use in a user device. As shown in FIG. 6, authentication semiconductor element 600 includes one or more memory storage device(s) 602, input/output interface(s) 604, central processing unit (CPU) 606, read-only memory 608, random-access memory 610, and/or power supply circuitry 614 in communication with each other. Input/output interface 604 includes circuitry for communicating with a user device, including circuitry for communicating through electrical contacts 612 with a user device the authentication element is installed in. Electrical contacts 612 are further configured to provide power received from a user device to power supply circuitry 614. CPU 606 may take the form of one or more processors, gate arrays, and/or circuit elements for executing program instructions and providing functionalities of an authentication semiconductor element. One or more storage devices such as memory storage device 602, read-only memory 608, and/or random-access memory 610, store program instructions for execution by CPU 606, as well as authentication data, user data, and the like. For a mobile device application, for example, authentication data stored in authentication element 600 may include a mobile directory number (MDN), mobile identification number (MIN), international mobile subscriber identity (IMSI) number, or other identifier for uniquely identifying the authentication element and the user device it is installed in when the user device connects to a communication network. The authentication data may also include one or more encryption keys, or other authentication and security related information necessary to enable a user device to communicate on a network. The storage devices can store data for use by a user device the authentication element is installed in, such as user data including phone directory information such as names of contacts and associated phone numbers.

While the description herein has referenced examples in which authentication element 200 functions like a UIC for use in a user device 300 such as a mobile phone or mobile station, various other types of authentication elements 200 and user devices 300 are envisioned. In one example, user device 300 is a device used in a wireless payment transaction, such as a user device using near field communication (NFC) technology to issue a payment to a wireless-enabled payment terminal. In such an example, authentication element 200 installed in user device 300 is a secure element used to authenticate the user of the device and issue a payment authorization for transmission to an antenna of the payment terminal. In order to issue payment authorizations, authentication element 200 may store authentication data including bank, credit card, or other financial account information for the user of the authentication element 200 and user payment device 300.

The authentication element 200 is removably installed into user device 300, and uniquely identifies the user device 300 it is installed in for communication on a communication network or for authentication and payment authorization with a wireless payment terminal. The identity of the user device 300 with the communication network or system, however, is linked to the authentication element. As a result, if a first authentication element 200 is installed in a first user device 300, the first user device will authenticate itself and/or communicate with a communication network or system using the unique identifier of the first authentication element 200. If the first authentication element 200 is removed from the first user device 300, the first user device may not be able to communicate or authenticate itself with the communication network or system until the same or another authentication element is installed in the user device. If the first authentication element 200 is then installed into a second user device different from the first user device, the second user device will authenticate itself and communicate using the same unique identifier of the first authentication element 200 previously used by the first user device. A different authentication element 200 can be installed in the first user device to enable the first user device to once again authenticate itself and communicate with the communication network or system. However, the first user device will then assume an identity associated with the different authentication element for communications with the network or system.

Figure 7:
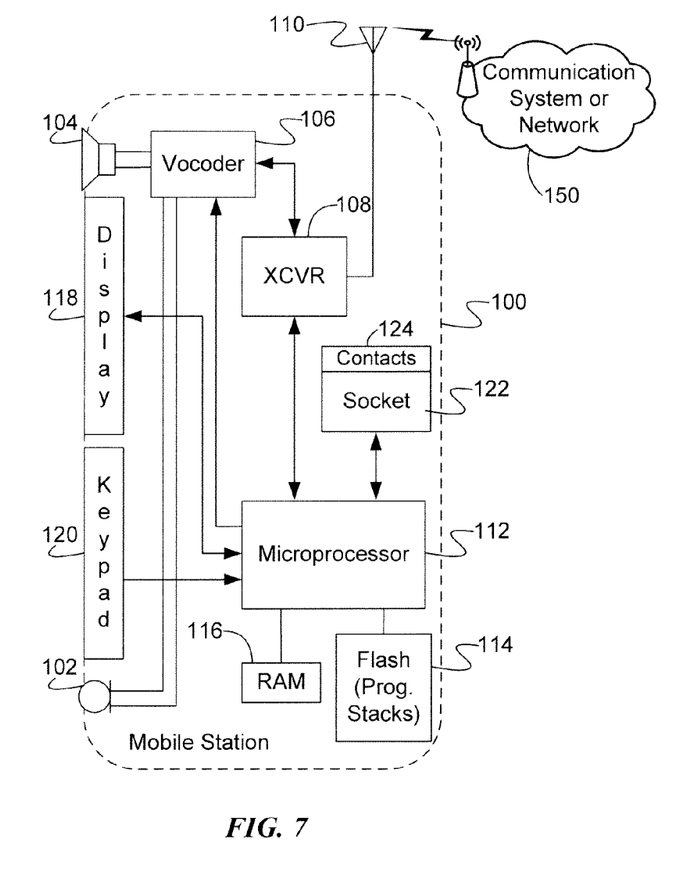
FIG. 7 is a high-level functional block diagram of an exemplary user device as may utilize the authentication semiconductor element to perform authentication and identification through a communication network.

FIG. 7 shows a high-level functional block diagram of an exemplary user device as may utilize the authentication semiconductor element to perform authentication and identification through a communication network. The user device may be a mobile station such as a feature phone, a smart-phone or a tablet, or may be incorporated into another device, such as a personal digital assistant (PDA), a portable computer, air card, or the like.

More generally, the user device may be any device configured to have an authentication element installed therein, and may include for example a wireless payment device configured to have a secure element installed therein. The principles of the invention may also be used in the context of other semiconductor elements configured for insertion into user devices. For example, the principles of the invention may be used to automatically align a memory device or card, such as an secure digital (SD) card or micro-SD card, having magnetic elements formed thereon, into a socket of a user device configured to receive the memory device and having contacts configured to contact with corresponding contacts on the memory device.

For discussion purposes, FIG. 7 shows a user device 100 in the form of a mobile phone handset, such as a feature phone or smart-phone. The handset embodiment of the user device 100 functions as a normal digital wireless telephone station. For that function, the device 100 includes a microphone 102 for audio signal input, a speaker 104 for audio signal output, and voice coding and decoding circuitry (vocoder) 106. The user device 100 also includes a display 118 and keypad 120 for providing a textual or graphical user interface. Although not shown in this simple example, many mobile phone devices include touchscreens as a major component of the user interface.

For digital wireless communications, the device 100 includes at least one communication interface such as a wireless digital transceiver (XCVR) 108. Today, the device 100 would be configured for digital wireless communications using one or more of the common network technology types. The concepts discussed here encompass embodiments of the user device 100 utilizing any digital transceivers that conform to current or future developed digital transceiver communication standards. The user device 100 may also be capable of analog operation via a legacy network technology, a wireless local area network, a global positioning system (GPS) receiver, and/or of communications using near-field communication (NFC) technologies. The transceiver 108 provides two-way wireless communication of information, such as vocoded speech samples and/or digital information, in accordance with the technology of the communication system and/or network 150 to which the device 100 connects. The transceiver 108 also sends and receives a variety of signaling messages in support of the various voice, data, and other communication services provided via the user device 100 and the external communication system/network 150. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

A microprocessor 112 serves as a programmable controller for the user device 100, in that it controls all operations of the user device 100 in accord with programming that it executes, for all normal operations, and for operations involved in interfacing with an authentication semiconductor element installed in the device 100. In the example, the user device 100 includes flash type program memory 114, for storage of various "software" or "firmware" program routines and mobile configuration settings for loading and execution in the microprocessor 112. The user device 100 may also include a non-volatile random access memory (RAM) 116. The memories 114, 116 also store various data, such as a boot routine, device driver software, an operating system, and other applications. The memories 114, 116 also store telephone numbers and server addresses, downloaded data and various data input by the user.

The user device 100 also includes socket 122 having electrical contacts 124, for connecting to and communicating with an authentication semiconductor element (such as authentication semiconductor elements 200 and/or 600) installed in the user device, and for retrieving from the authentication semiconductor element identification or authentication information such as a mobile directory number (MDN) and/or mobile identification number (MIN), etc. In one example, programming stored in the flash memory 114 configures the processor 112 so that the mobile station is capable of performing various desired functions, including functions related to communicating with an authentication semiconductor device installed in the user device through socket 122. In particular, processor 112 communicates with an authentication semiconductor device installed in device 100 to retrieve an international mobile subscriber identity (IMSI) identifier stored on the installed authentication element. The processor then transmits the retrieved IMSI to the communication network or system 150 to identify and/or authenticate the device 100 and installed authentication element for communication.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An authentication semiconductor element for a portable user device, the element comprising:
    a semiconductor substrate;
    an electrical circuit, comprising interconnected components embodied in the semiconductor substrate, configured to provide a function related to authentication of the portable user device to an external system or network;
    electrical contacts formed on at least one surface of the semiconductor substrate connected to the electrical circuit, a plurality of the electrical contacts being positioned on the at least one surface for contacting complimentary contacts of the portable user device when the authentication semiconductor element is installed in the portable user device; and
    at least two magnetic elements, located at positions for magnetic interaction with one or more parts of the portable user device to magnetically align the semiconductor substrate when installed in the portable user device so that the electrical contacts of the authentication semiconductor element are aligned with the complimentary contacts of the portable user device,
    wherein the components of the electrical circuit are configured to enable the electrical circuit to provide a user identity card function for authentication of a mobile station type portable user device or for authentication of a wireless payment transaction.

2. The authentication semiconductor element of claim 1, wherein each magnetic element comprises an electrical contact formed of a magnetic material.

3. The authentication semiconductor element of claim 2, wherein the at least two magnetic elements are magnets of opposite magnetic polarities.

4. The authentication semiconductor element of claim 2, wherein each magnetic element is formed of a ferromagnetic material.

5. The authentication semiconductor element of claim 1, wherein the at least two magnetic elements are located on side surfaces of the semiconductor substrate.

6. The authentication semiconductor element of claim 1, wherein the components of the electrical circuit are configured to enable the electrical circuit to provide the user identity card function for authentication of the mobile station type portable user device.

7. The authentication semiconductor element of claim 1, wherein the components of the electrical circuit are configured to enable the electrical circuit to provide the secure element function for authentication of the wireless payment transaction.

8. A portable user device, comprising:
    a communication interface, for communication with an external system or network;
    a processor coupled to the communication interface; and
    a socket, receiving and providing a connection of the processor to an authentication semiconductor element when installed in the portable user device, the socket comprising:
        electrical contacts formed on at least one surface in the portable device and electrically connected to the processor, a plurality of the electrical contacts being positioned on the at least one surface for contacting complimentary contacts of the authentication semiconductor element when the authentication semiconductor element is installed in the portable user device; and
        at least two magnetic elements, located at positions for magnetic interaction with one or more parts of the authentication semiconductor element to magnetically align the authentication semiconductor element when installed in the portable user device so that the complimentary contacts of the authentication semiconductor element are aligned with the electrical contacts of the portable user device,
    wherein:
        (i) the communication interface comprises a wireless transceiver for communication via a mobile communication network, and the processor is configured so that the portable user device functions as a mobile station configured to use the authentication semiconductor element when installed to provide a user identity card function for authentication of the mobile station; or
        (ii) the communication interface comprises a wireless transceiver for communication with a wireless payment terminal, and the processor is configured so that the portable user device functions as a wireless payment device configured to use the authentication semiconductor element when installed to provide a secure element function for authentication of a wireless payment transaction.

9. The portable user device of claim 8, wherein:
the communication interface comprises the wireless transceiver for communication via the mobile communication network; and
the processor is configured so that the portable user device functions as the mobile station configured to use the authentication semiconductor element when installed to provide the user identity card function for authentication of the mobile station.

10. The portable user device of claim 8, wherein:
the communication interface comprises the wireless transceiver for communication with the wireless payment terminal; and
the processor is configured so that the portable user device functions as the wireless payment device configured to use the authentication semiconductor element when installed to provide the secure element function for authentication of the wireless payment transaction.

11. The portable user device of claim 8, wherein each magnetic element comprises a ferromagnetic material.

12. The portable user device of claim 8, wherein the at least two magnetic elements are magnets of opposite magnetic polarities.

13. The portable user device of claim 8, wherein the at least two magnetic elements are located on side surfaces of the socket.

14. An apparatus, comprising:
a portable user device, comprising:
(a) a communication interface, for communication with an external system or network;
(b) a processor coupled to the communication interface;
(c) a socket comprising electrical contacts formed on at least one surface in the portable device and electrically connected to the processor; and
(d) at least two magnetic elements configured to align in place an authentication semiconductor element installed in the portable user device; and
an authentication semiconductor element, the authentication semiconductor element comprising:
(i) a semiconductor substrate;
(ii) an electrical circuit, comprising interconnected components embodied in the semiconductor substrate, configured to provide a function related to authentication of the portable user device to the external system or network;
(iii) electrical contacts formed on at least one surface of the semiconductor substrate connected to the electrical circuit, a plurality of the electrical contacts being positioned on the at least one surface for contacting complimentary electrical contacts of the socket when the authentication semiconductor element is installed in the portable user device; and
(iv) at least two magnetic elements, located at positions for interaction with the magnetic elements of the portable user device,
wherein the magnetic elements of one of the portable user device and the authentication semiconductor element are magnets that are configured to magnetically interact with the magnetic elements of the other of the portable user device and the authentication semiconductor elements to align the semiconductor substrate when installed in the portable user device such that the electrical contacts of the authentication semiconductor element are aligned with the complimentary electrical contacts of the socket, and
wherein: (1) the apparatus is configured as a mobile station and the electrical circuit is configured to enable the authentication semiconductor element to provide a user identity card function for authentication of the mobile station, or (2) the apparatus is configured as a wireless payment device and the electrical circuit is configured to enable the authentication semiconductor element to provide a secure element function for authentication of a wireless payment transaction through the wireless payment device.

15. The apparatus of claim 14 configured as the mobile station, wherein the electrical circuit is configured to enable the authentication semiconductor element to provide the user identity card function for authentication of the mobile station.

16. The apparatus of claim 14 configured as the wireless payment device, wherein the electrical circuit is configured to enable the authentication semiconductor element to provide the secure element function for authentication of the wireless payment transaction through the wireless payment device.

17. The apparatus of claim 14, wherein the at least two magnetic elements of the portable user device are located on side surfaces of the socket, and the at least two magnetic elements of the authentication semiconductor element are located on side surfaces of the authentication semiconductor element.

18. The apparatus of claim 14, wherein:
the magnetic elements of the portable user device are magnets; and
the magnetic elements of the authentication semiconductor device are formed of a ferromagnetic material.

19. The apparatus of claim 14, wherein:
the magnetic elements of the portable user device are magnets each having a polarity;
the magnetic elements of the authentication semiconductor device are magnets each having a polarity; and
each magnetic element of the authentication semiconductor device has a polarity opposite to the polarity of a corresponding magnetic element of the portable user device.

* * * * *